(12) United States Patent
Yamaguchi (10) Patent No.: US 7,674,198 B2
(45) Date of Patent: Mar. 9, 2010

(54) BICYCLE REAR DERAILLEUR

(75) Inventor: Souta Yamaguchi, Sakai (JP)

(73) Assignee: Shimano Inc., Osaka (JP)

( * ) Notice: Subject to any disclaimer, the term of this patent is extended or adjusted under 35 U.S.C. 154(b) by 559 days.

(21) Appl. No.: 11/518,461

(22) Filed: Sep. 11, 2006

(65) Prior Publication Data

US 2008/0064545 A1    Mar. 13, 2008

(51) Int. Cl.
F16H 9/00 (2006.01)
F16H 59/00 (2006.01)
F16H 61/00 (2006.01)
F16H 63/00 (2006.01)

(52) U.S. Cl. .......................... 474/82; 474/80
(58) Field of Classification Search ............... 474/80, 474/82

See application file for complete search history.

(56) References Cited

U.S. PATENT DOCUMENTS 4,637,808 A * 1/1987 Nakamura .................. 474/80

6,793,598 B1    9/2004 Savard

FOREIGN PATENT DOCUMENTS

| JP | S60-174383 | | 9/1985 |
|----|------------|---|--------|
| JP | S60-261788 | | 12/1985 |
| JP | S62-99291 | * | 5/1987 |
| JP | S63-11493 | | 1/1988 |

* cited by examiner

Primary Examiner—Robert A Siconolfi
Assistant Examiner—Henry Liu
(74) Attorney, Agent, or Firm—Global IP Counselors, LLP (57) ABSTRACT

A main derailleur body includes a first end and a second end. The first end of the main derailleur body is configured to be mounted to a bicycle. A chain cage is pivotally coupled to the second end of the main derailleur body between at least a first orientation and a second orientation. A first pulley is rotatably mounted relative to the main derailleur body. A second pulley is rotatably mounted to the chain cage to move therewith relative to the main derailleur body. A third pulley is rotatably mounted to the main derailleur body such that the third pulley engages a chain extending between the first and second pulleys when the chain cage is in the first orientation and disengages the chain upon movement of the chain cage from the first orientation to the second orientation.

15 Claims, 6 Drawing Sheets

BICYCLE REAR DERAILLEUR

BACKGROUND OF THE INVENTION

1. Field of the Invention

This invention generally relates to a bicycle rear derailleur. More specifically, the present invention relates to a bicycle rear derailleur that uses three pulleys to guide and tension a bicycle chain.

2. Background Information

Bicycling is becoming an increasingly more popular form of recreation as well as a means of transportation. Moreover, bicycling has become a very popular competitive sport for both amateurs and professionals. Whether the bicycle is used for recreation, transportation or competition, the bicycle industry is constantly improving the various components of the bicycle. One component that has been extensively redesigned is the bicycle rear derailleur.

A rear derailleur typically has a main derailleur body and a chain guide or cage 13 with a first or guide pulley and a second or tension pulley. The main derailleur body basically has a base member, a linkage or moving mechanism and a movable member. The base member is typically a stationary member that can be mounted to the rear part of the bicycle frame. The linkage or moving mechanism has one end that is mounted to the base member and the other end mounted to the moving mechanism. The movable member is capable of relative movement with respect to the base-member between a top gear position and a low gear position. The chain guide is pivotally mounted to movable member. A biasing member is typically provided to bias the movable member in one direction relative to the base member. The biasing member is a coil spring, for example, that is mounted inside the link mechanism. In order to maintain appropriate tension a bicycle chain, the movable member typically includes a spring that biases the chain guide to a retracted position. The chain guide often pivotally supports the guide (first) pulley and the tension (second) pulley that is spaced apart from the guide (first) pulley. When tensioned, the chain wraps around the chain pulleys along a serpentine path. The chain guide is configured to move the chain between a plurality of differing diameter chain sprockets in a sprocket set. Since the chain sprockets have differing diameters, the distance between the chain pulleys must be sufficiently large to accommodate the various diameters of the chain sprockets. This requires a corresponding increase in the length of the chain guide. Unfortunately, such an increase in the length of the chain guide is an undesirable design feature in current bicycle configurations. Therefore, it is desirable to reduce the length of the chain guide.

In view of the above, it will be apparent to those skilled in the art from this disclosure that there exists a need for an improved bicycle rear derailleur. This invention addresses this need in the art as well as other needs, which will become apparent to those skilled in the art from this disclosure.

SUMMARY OF THE INVENTION

One object of the present invention is to provide a chain guide of a bicycle rear derailleur with sufficient chain tensioning characteristics without increasing the length of the chain guide.

The foregoing objects can basically be attained by providing a bicycle rear derailleur with a main derailleur body, a chain cage, a first pulley, a second pulley and a third pulley. The main derailleur body has a first end and a second end with the first end being configured to be mounted to a bicycle. The chain cage is pivotally coupled to the second end of the main derailleur body between at least a first orientation and a second orientation. The first pulley is rotatably mounted relative to the main derailleur body and the second pulley is rotatably mounted to the chain cage to move therewith relative to the main derailleur body. The third pulley is rotatably mounted to the main derailleur body such that the third pulley engages a chain extending between the first and second pulleys when the chain cage is in the first orientation and disengages the chain upon movement of the chain cage from the first orientation to the second orientation.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
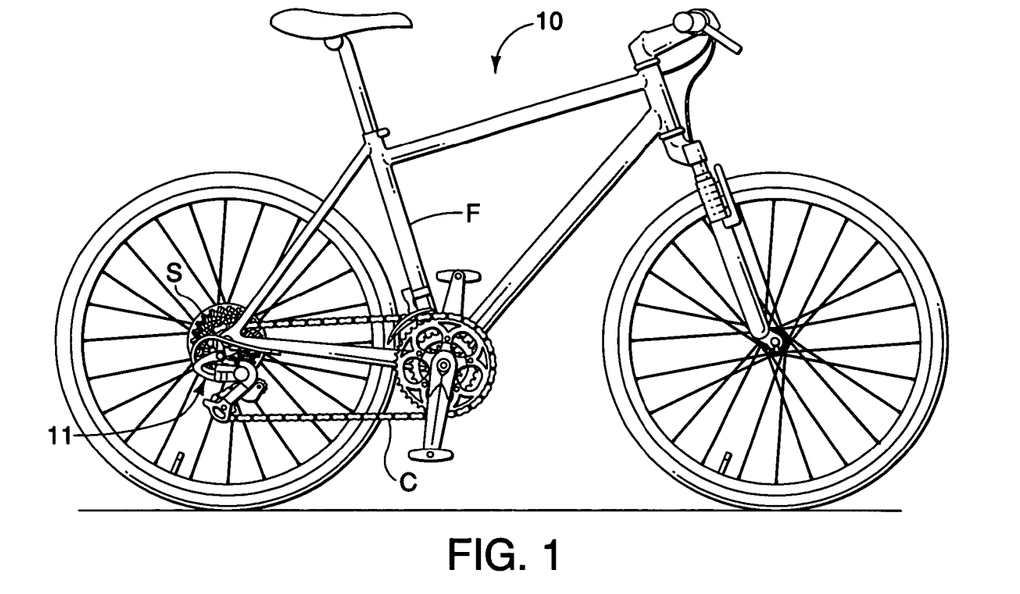
FIG. 1 is a side elevational view of a bicycle that includes a rear derailleur and chain in accordance with one embodiment of the present invention.
Figure 2:
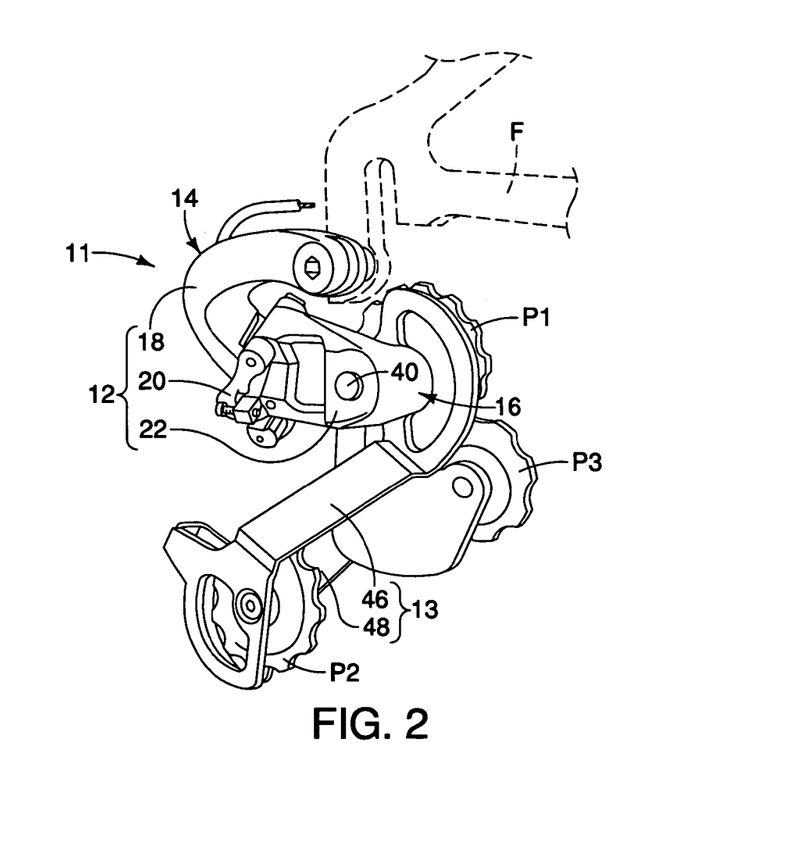
FIG. 2 is a perspective view of the rear derailleur showing a chain cage and first, second and third pulleys with the chain cage in a first orientation in accordance with one embodiment of the present invention.

Referring initially to FIG. 1, a bicycle 10 is illustrated that is equipped with a rear derailleur 11 in accordance with a first embodiment of the present invention. With specific reference to FIG. 2, the rear derailleur 11 basically has a main derailleur body 12 and a chain guide or cage 13 with a first pulley P1, a second pulley P2 and a third pulley P3. The main derailleur body 12 has a first end 14 releasably mounted to the bicycle 10, and a second end 16 pivotally supporting the chain cage 13 to the main derailleur body 12. The main derailleur body 12 basically includes a base member 18, a linkage assembly 20 and a movable member 22. The three chain pulleys P1, P2 and P3 of the rear derailleur 11 are configured for engaging a chain C of the bicycle 10 in accordance with the present invention, as described in greater detail below. The three chain pulleys P1, P2 and P3 provide a lengthened serpentine chain path for the chain C without an increase in the overall size of the various portions of the rear derailleur 11, as described in greater detail below.

Figure 3:
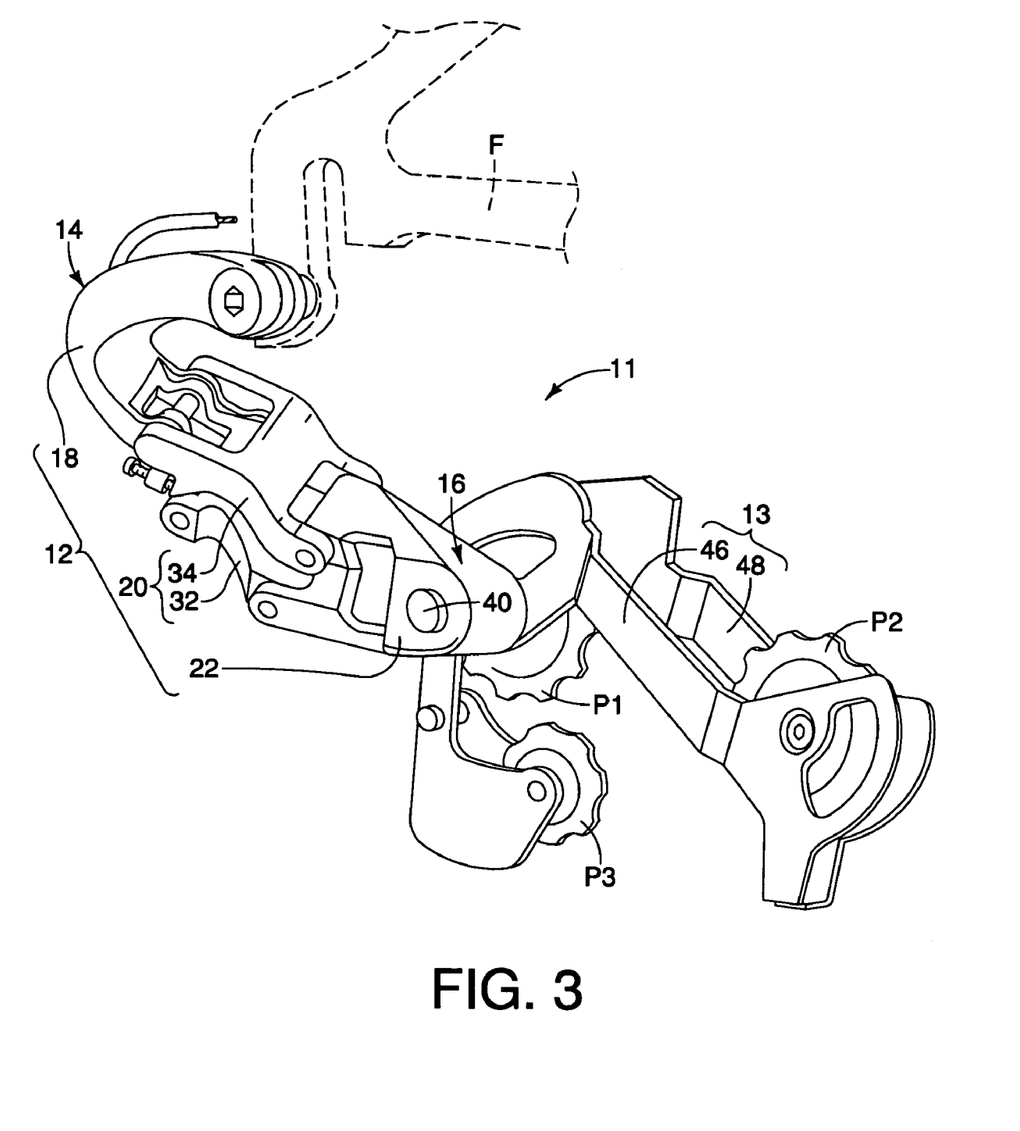
FIG. 3 is a perspective view of the rear derailleur similar to FIG. 2 showing the chain cage in a second orientation in accordance with one embodiment of the present invention.
Figure 4:
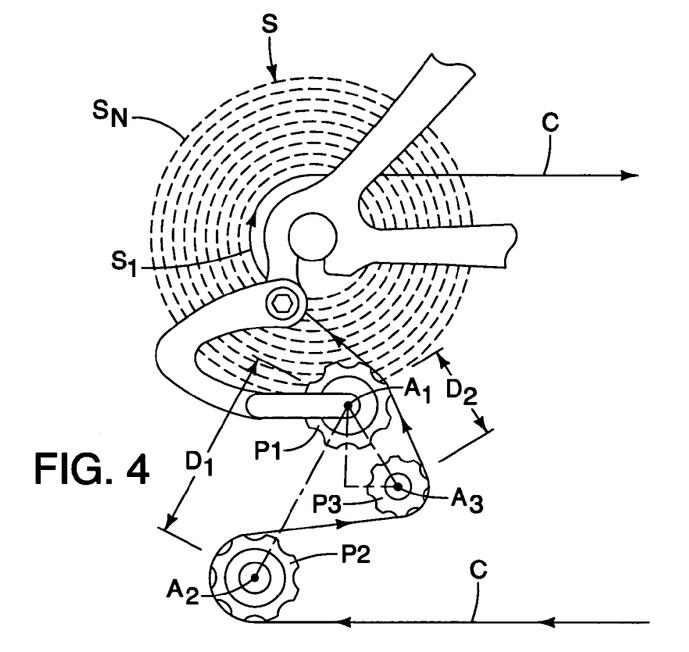
FIG. 4 is a side schematic view of the rear derailleur showing the chain cage in the first orientation with the first, second and third pulleys all contacting the chain in accordance with one embodiment of the present invention.
Figure 5:
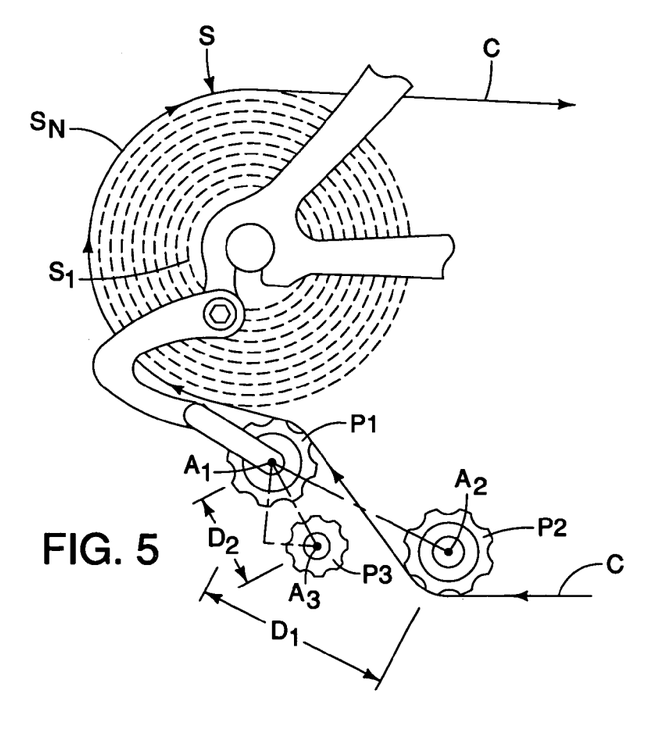
FIG. 5 is a side schematic view of the rear derailleur showing the chain cage in the second orientation with the first and second pulleys contacting the chain and the third pulley spaced apart from the chain in accordance with one embodiment of the present invention.

With specific reference to FIGS. 2, 3, 4 and 5, a more detailed description of the rear derailleur 11 will now be provided. The first end 14 of the rear derailleur 11 is configured to be mounted to a rear portion of a frame F of the bicycle 10 and includes the base member 18 in the illustrated embodiment. The second end 16 of the rear derailleur 11 includes the movable member 22 in the illustrated embodiment, with the chain cage 13 being pivotally coupled to the movable member 22 (the second end 16) of the rear derailleur 11 between at least a first orientation (FIGS. 2 and 4) and a second orientation (FIGS. 3 and 5).

The base member 18 is connected to the frame F of the bicycle 10 and supports the linkage assembly 20 in a conventional manner. The linkage assembly 20 includes at least two links 32 and 34 that are pivotally connected at one end to the base member 18 and pivotally connected at another end to the movable member 22. The linkage assembly 20 is a moving mechanism that is operatively coupled between the base member 18 and the movable member 22 to move the movable member 22 and the chain cage 13 relative to the base member 18. The linkage assembly 20 is also configured to move the movable member 22 and the chain cage 13 and thereby positioning the chain C relative to a plurality of chain sprockets S1 through SN of a sprocket set S. For instance, in the first orientation depicted in FIGS. 2 and 4, the chain C is positioned by the chain cage 13 to engage the chain sprocket S1 of the sprocket set S. In the second orientation depicted in FIGS. 3 and 5, the chain C is positioned by the chain cage 13 to engage the chain sprocket SN of the sprocket set S.

As indicated schematically in FIGS. 4 and 5, several chain sprockets are included in the sprocket set S. It should be understood from the drawings and the description herein, that the first and second orientations of the chain cage 13 depicted in the drawings are examples of only two such orientations. Specifically, there is a unique orientation of the chain cage 13 relative to the base member 18 for each chain sprocket in the sprocket set S. In other words, the rear derailleur 11 is manipulated in order to move the chain cage 13 to guide or shift the chain C between the plurality of chain sprockets of the sprocket set S. For each chain sprocket in the sprocket set S, the chain cage 13 is moved to a unique position or orientation to bring the chain C into engagement with the corresponding chain sprocket.

Figure 6:
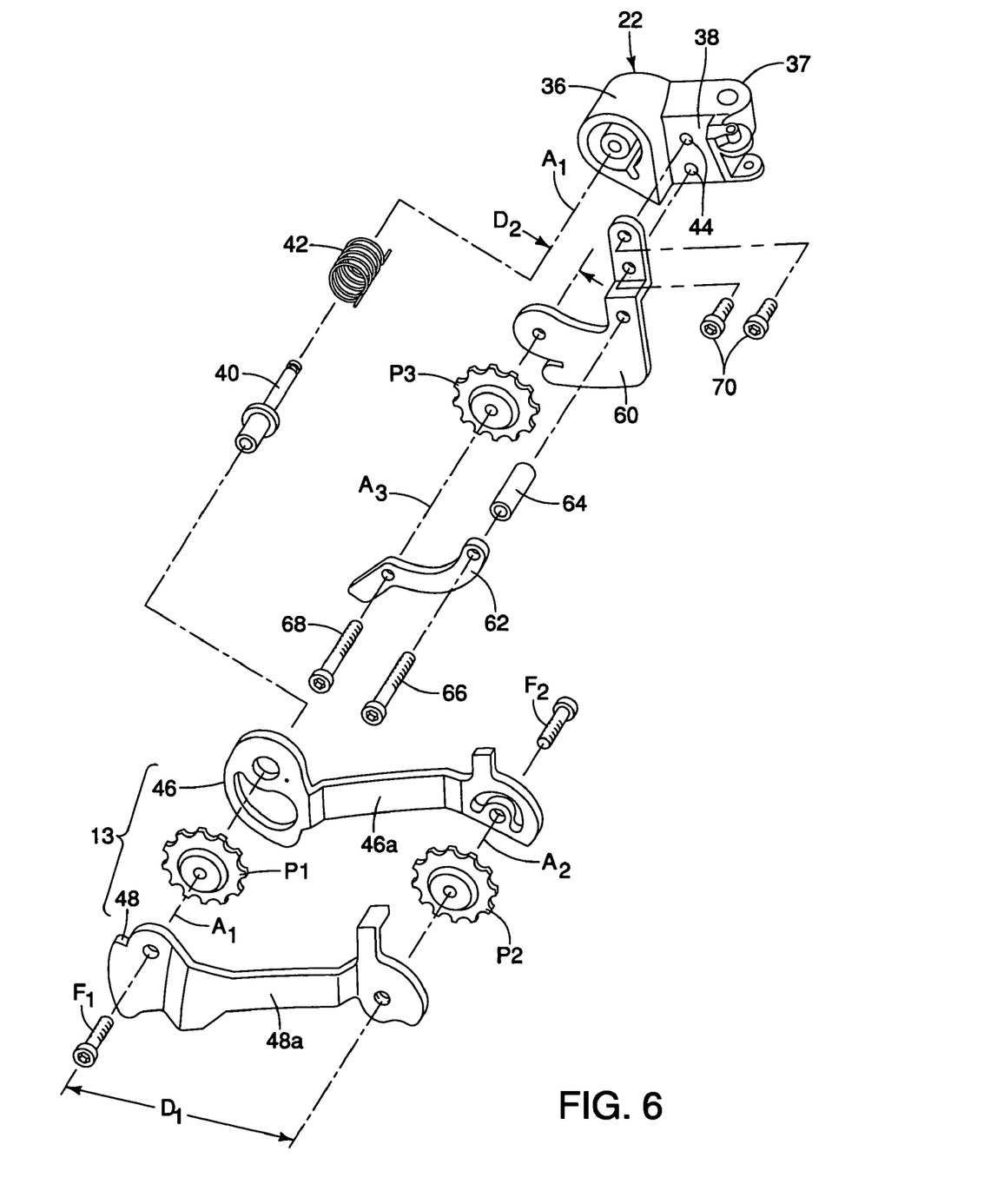
FIG. 6 is an exploded perspective view of the rear derailleur showing a movable member and a support bracket that supports the third pulley in accordance with one embodiment of the present invention.
Figure 7:
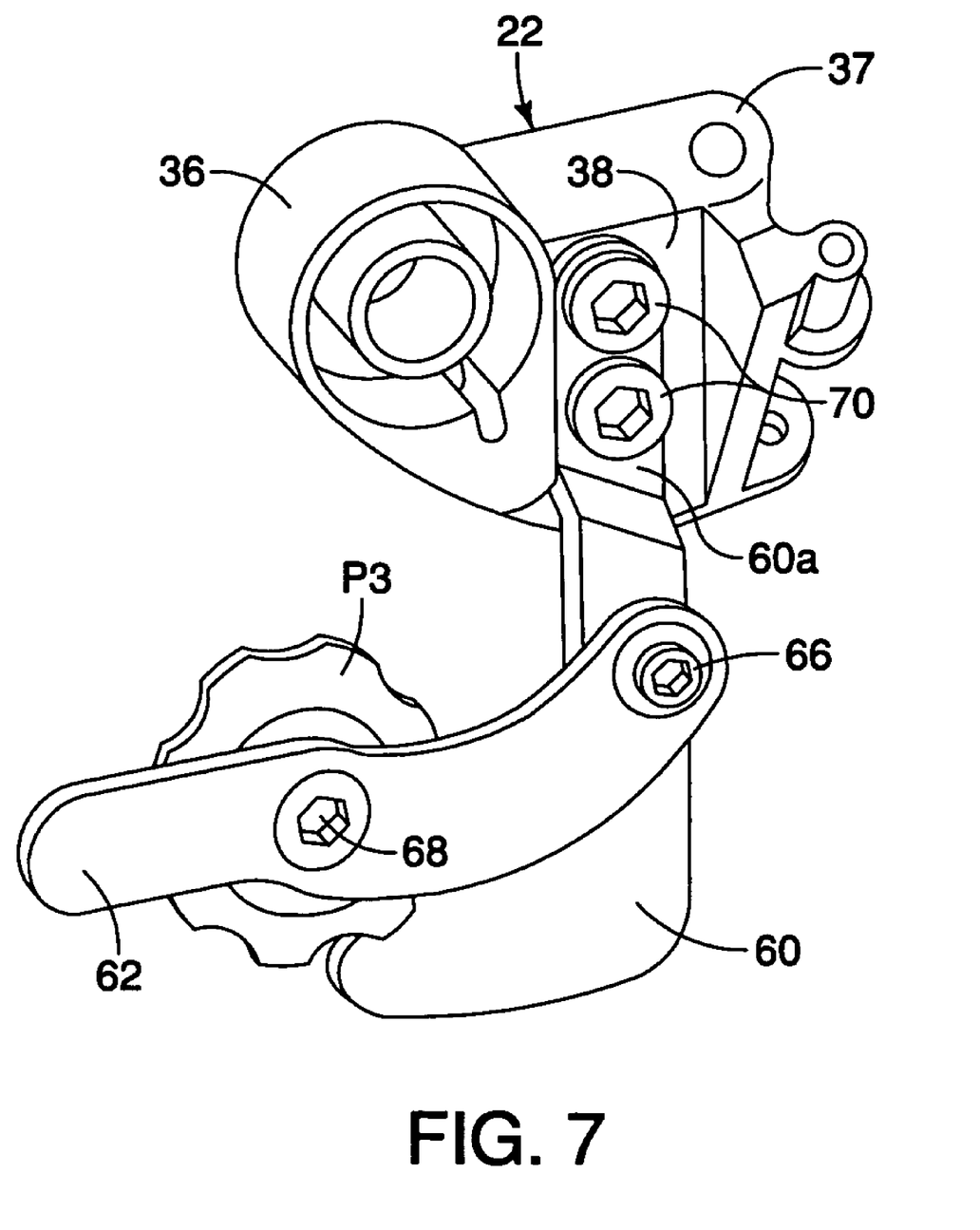
FIG. 7 is a perspective view of the movable member, the support bracket and the third pulley in accordance with one embodiment of the present invention.

As shown in FIGS. 6 and 7, the movable member 22 basically includes a cylindrical portion 36 having a hollow interior, a linkage attachment portion 37, a bracket attachment section 38, a pivot axle 40 and a coil spring 42. The pivot axle 40 and the coil spring 42 are at least partially housed in the hollow interior of the cylindrical portion 36. The linkage assembly 20 is pivotally connected to the linkage attachment portion 37. The bracket attachment section 38 includes a pair of threaded apertures 44 (FIG. 6 only).

With reference again to FIGS. 2, 3, 6 and 8, a description of the chain cage 13 is now provided. The chain cage 13 basically includes an outer plate 46 and an inner plate 48. The chain cage 13 is pivotally coupled to the movable member 22 for pivoting movement about a first pivot axis A1. More specifically, the chain cage 13 is attached to the pivot axle 40 with the pivot axle 40 being installed in the hollow interior of the movable member 22.

Figure 8:
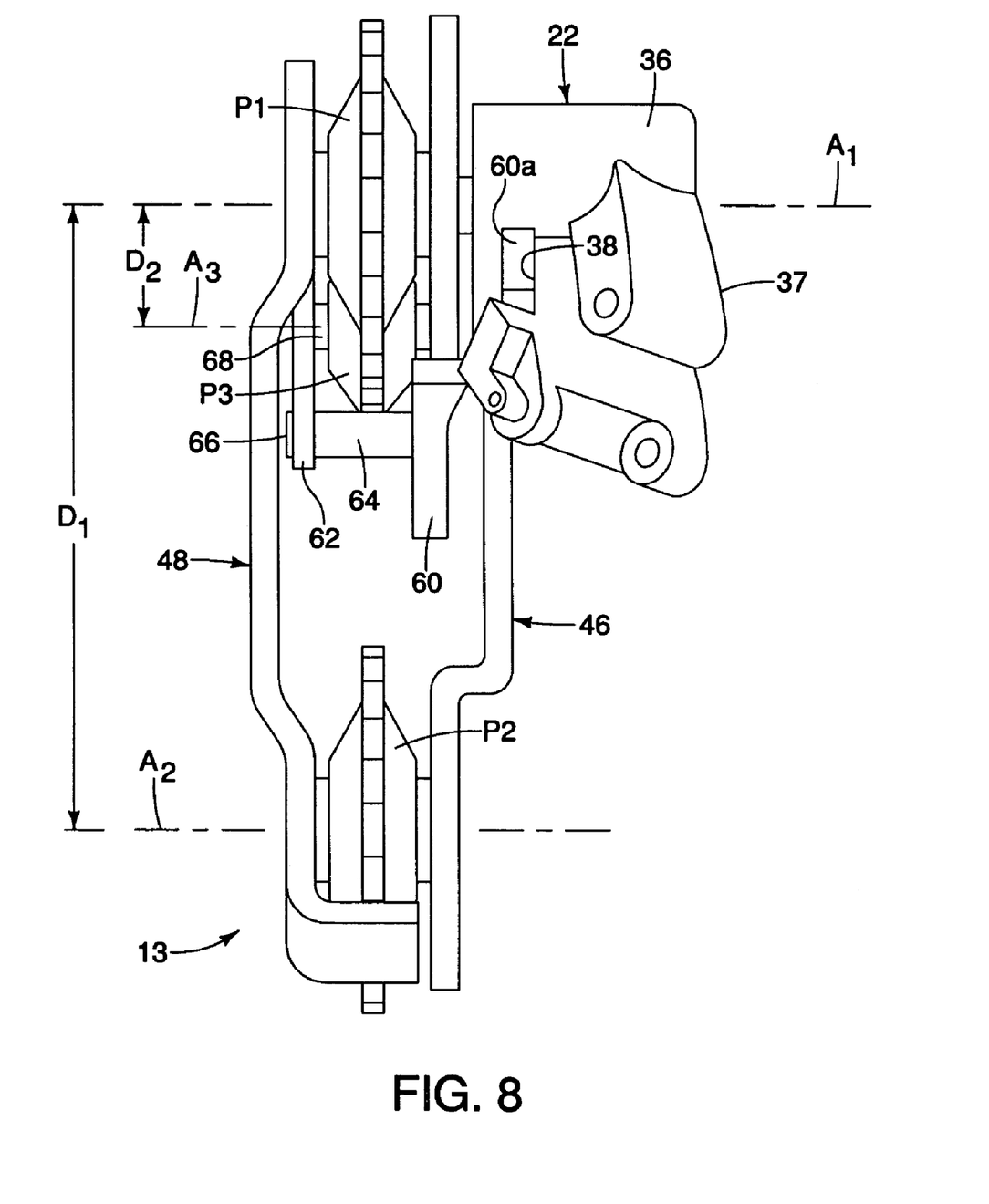
FIG. 8 is a rear elevational view of the rear derailleur with portions of the derailleur removed to show details of the movable member, the chain cage, the support bracket and the first, second and third pulleys in accordance with one embodiment of the present invention.

As best shown in FIGS. 6 and 8, the outer plate 46 includes an offset portion 46a that is offset a predetermined distance farther away from the inner plate 48 than the ends of the outer plate 46. Similarly, the inner plate 48 includes an offset portion 48a that is offset a predetermined distance farther away from the outer plate 46 than the ends of the inner plate 48. As indicated in FIG. 6, the outer plate 46 is mounted to the pivot axle 40 for rotation about the first pivot axis A1. The inner plate 48 is fixed to the outer plate 46 by fasteners $F_1$ and $F_2$.

As indicated in FIG. 6, the first pulley P1 is rotatably retained to the pivot axle 40 between the outer and inner plates 46 and 48 by the fastener $F_1$. Specifically, the fastener $F_1$ extends through an aperture in the inner plate 48, through an aperture in the first pulley P1, through an aperture in the outer plate 46 and into a threaded aperture in the pivot axle 40. Hence, the first pulley P1 is mounted to the pivot axle 40 for rotation about the first pivot axis $A_1$. The first pulley P1 is further rotatable relative to the main derailleur body 12. Further, the first pulley P1 rotates about the first pivot axis $A_1$, as does the chain cage 13. Hence, the first pulley P1 rotates about a rotational axis that is coincident with a pivot axis of the chain cage 13. Further, the first pivot axis $A_1$ is fixed in position relative to the movable member 22.

As also indicated in FIG. 6, the second pulley P2 is rotatably mounted to the chain cage 22 to move therewith relative to the main derailleur body 12, but rotates about a second pivot axis $A_2$ that is movable relative to the movable member 22. Specifically, the second pivot axis $A_2$ is fixed relative to the chain cage 13. Since the chain cage 13 pivots about the pivot axle 40, the second pivot axis $A_2$ is movable relative to the movable member 22. The first and second pulleys P1 and P2 are arranged to form a serpentining chain path therebetween.

The second pulley P2 is rotatably retained between the outer and inner plates 46 and 48 by the fastener $F_2$. Specifically, the fastener $F_2$ extends through an aperture in the outer plate 46, through an aperture in the second pulley P2 and into a threaded aperture in the inner plate 48. The fastener $F_2$ defines the second pivot axis $A_2$. The second pivot axis $A_2$ is spaced apart from the first pivot axis $A_1$ by a distance $D_1$.

As indicated in FIG. 6, the third pulley P3 is rotatably supported to the second end 16 of the main derailleur body 12 by a support bracket or member 60 that is separate from the chain cage 13. Further, the third pulley P3 is rotatably mounted to the main derailleur body 12 such that the third pulley P3 engages the chain C extending between the first and second pulleys P1 and P2 when the chain cage 13 is in the first orientation (FIG. 4) and disengages the chain C upon movement of the chain cage 13 from the first orientation to the second orientation (FIG. 5).

The third pulley P3 is supported by the support bracket 60 along with a second bracket 62, a spacer 64, a fastener 66 and a fastener shaft 68. Specifically, the support bracket 60 is fixed to the movable member 22 by two fasteners 70 that are installed in the threaded apertures 44 in the bracket attachment section 38 of the movable member 22. The second bracket 62 is fixed to the support bracket 60 by the fastener 66 and the fastener shaft 68. The fastener 66 extends through an aperture in the second bracket 62, through the spacer 64 and into a threaded aperture in the support bracket 60. The fastener shaft 68 extends through an aperture in the second bracket 62, through an aperture in the third pulley P3 and into a threaded aperture in the support bracket 60. The fastener shaft 68 defines a third pivot axis $A_3$. Hence, the third pulley P3 rotates about the third pivot axis $A_3$.

The third pivot axis $A_3$ is spaced apart from the first pivot axis $A_1$ by a second distance $D_2$. The first distance $D_1$ is greater than the second distance $D_2$. Hence, the first and second pulleys P1 and P2 are spaced apart from one another by the second distance $D_2$. Since the support bracket 60 is fixed to the movable member 22, the first and third pivot axes $A_1$ and $A_3$ are spaced apart from one another by a fixed distance. Similarly, since the first and second pivot axis $A_1$ and $A_2$ of the first and second pulleys P1 and P2 are fixed in position relative to the chain cage 13, the distance between the first and second pulleys P1 and P2 is fixed. However, the distance between the second and third pulleys P2 and P3 is variable, as indicated by comparing FIGS. 4 and 5.

The geometry of the third pulley P3 is such that the third pulley P3 is fixedly mounted to the main derailleur body 12 in a location between the first and second pulleys P1 and P2 along the serpentining chain path (FIGS. 4 and 5) with the second pulley P1 being disposed rearward of the second end 16 of the main derailleur body 12 towards the third pulley P3 when the chain cage 13 is in the first orientation (FIG. 4). Further, the second pulley P2 is disposed forward of the third pulley P3 when the chain cage 13 is in the second orientation (FIG. 5).

The third pulley P3 lengthens the serpentining chain path as the second pulley P2 moves from the second orientation to the first orientation. Therefore, the chain C can be tensioned effectively without increasing the length of the chain cage 13.

General Interpretation of Terms

In understanding the scope of the present invention, the term "configured" as used herein to describe a component, section or part of a device includes hardware that is constructed to carry out the desired function. The terms "part," "section," "portion," "member" or "element" when used in the singular can have the dual meaning of a single part or a plurality of parts. As used herein to describe the present invention, the following directional terms "forward, rearward, above, downward, vertical, horizontal, below and transverse" as well as any other similar directional terms refer to those directions of a bicycle equipped with the present invention. Accordingly, these terms, as utilized to describe the present invention should be interpreted relative to a bicycle equipped with the present invention as used in the normal riding position. Finally, terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents.

What is claimed is:
1. A bicycle rear derailleur comprising:
a main derailleur body having a first end and a second end with the first end being configured to be mounted to a bicycle;
a chain cage pivotally coupled to the second end of the main derailleur body between at least a first orientation and a second orientation;
a first pulley rotatably mounted relative to the main derailleur body;
a second pulley rotatably mounted to the chain cage to move therewith relative to the main derailleur body; and
a third pulley rotatably mounted to the main derailleur body about a rotational axis that is fixed relative to the main derailleur body in a location between the first and second pulleys as determined along a chain travel path extending between the first and second pulleys such that the first, second and third pulleys engage a chain extending between the first and second pulleys when the chain cage is in the first orientation and such that the first and second pulleys remain engaged with the chain while the third pulley disengages the chain upon movement of the chain cage from the first orientation to the second orientation.

2. The bicycle rear derailleur as set forth in claim 1, wherein
the first pulley has a first rotational axis that is coincident with a pivot axis of the chain cage.

3. The bicycle rear derailleur as set forth in claim 1, wherein
the third pulley is rotatably supported to the second end of the main derailleur body by a support member that is separate from the chain cage such that the third pulley remains stationary with respect to the main derailleur body during movement of the chain cage between the first and second orientations.

4. The bicycle rear derailleur as set forth in claim 1, wherein
the first pulley has a first rotational axis, the second pulley has a second rotational axis, and the third pulley has a third rotational axis, with the first and second rotational axes of the first and second pulleys being spaced apart by a first distance and the first and third rotational axes of the first and third pulleys being spaced apart by a second distance such that the first distance is greater than the second distance.

5. The bicycle rear derailleur as set forth in claim 1, wherein
the first end of the main derailleur body includes a base member, the second end of the main derailleur body includes a movable member, and the main derailleur body further includes a moving mechanism operatively coupled between the base member and the movable member to move the movable member and the chain cage relative to the base member.

6. The bicycle rear derailleur as set forth in claim 5, wherein
the first pulley has a first rotational axis that is fixed relative to the movable member, the second pulley has a second rotational axis that is movable relative to the movable member, and the third pulley has a third rotational axis that is fixed relative to the movable member.

7. The bicycle rear derailleur as set forth in claim 1, wherein
the first and second pulleys are arranged such that the chain travel path forms a serpentining chain path therebetween, and the third pulley is mounted to the main derailleur body in a location between the first and second pulleys along the serpentining chain path with the second pulley being disposed rearward of the third pulley when the chain cage is in the first orientation and the second pulley being disposed forward of the third pulley when the chain cage is in the second orientation.

8. A bicycle rear derailleur comprising:
a main derailleur body having a first end and a second end with the first end being configured to be mounted to a bicycle;
a chain cage pivotally coupled to the second end of the main derailleur body about a chain cage pivot axis between at least a first orientation and a second orientation;
a first pulley rotatably mounted relative to the main derailleur body with a forward facing chain contacting area such that the first pulley rotates in a counterclockwise direction during operation of the rear derailleur with a forward pedaling motion as viewed from a side of the first pulley that faces away from the bicycle when the rear derailleur is mounted to the bicycle, the first pulley having a first rotational axis that is coincident with the chain cage pivot axis;
a second pulley rotatably mounted to the chain cage to move therewith relative to the main derailleur body with a rearward facing chain contacting area such that the second pulley rotates in a clockwise direction during operation of the rear derailleur with the forward pedaling motion as viewed from a side of the first pulley that faces away from the bicycle when the rear derailleur is mounted to the bicycle, the first and second pulleys being arranged to form a serpentining chain path therebetween; and
a third pulley rotatably mounted to the main derailleur body in a location between the first and second pulleys along the serpentining chain path with a forward facing chain contacting area such that the third pulley rotates in a counterclockwise direction during operation of the rear derailleur with the forward pedaling motion as viewed from a side of the first pulley that faces away from the bicycle when the rear derailleur is mounted to the bicycle, and the second pulley being disposed rearward of the third pulley when the chain cage is in the first orientation and the second pulley being disposed forward of the third pulley when the chain cage is in the second orientation.

9. The bicycle rear derailleur as set forth in claim 8, wherein
the third pulley is rotatably supported to the second end of the main derailleur body by a support member that is separate from the chain cage such that the third pulley remains stationary with respect to the main derailleur body during movement of the chain cage between the first and second orientations.

10. The bicycle rear derailleur as set forth in claim 8, wherein
the first pulley has a first rotational axis, the second pulley has a second rotational axis, and the third pulley has a third rotational axis, with the first and second rotational axes of the first and second pulleys being spaced apart by a first distance and the first and third rotational axes of the first and third pulleys being spaced apart by a second distance such that the first distance is greater than the second distance.

11. The bicycle rear derailleur as set forth in claim 8, wherein
the first end of the main derailleur body includes a base member, the second end of the main derailleur body includes a movable member, and the main derailleur body further includes a moving mechanism operatively coupled between the base member and the movable member to move the movable member and the chain cage relative to the base member.

12. The bicycle rear derailleur as set forth in claim 11, wherein
the first pulley has a first rotational axis that is fixed relative to the movable member, the second pulley has a second rotational axis that is movable relative to the movable member, and the third pulley has a third rotational axis that is fixed relative to the movable member.

13. A bicycle rear derailleur comprising:
a main derailleur body having a first end and a second end with the first end being configured to be mounted to a bicycle;
a chain cage having a pair of plate members pivotally coupled to the second end of the main derailleur body between at least a first orientation and a second orientation;
a first pulley rotatably mounted relative to the main derailleur body to rotate about a first rotational axis that is fixed in a position relative to the second end of the main derailleur body, the first rotational axis of the first pulley being coincident with a pivot axis of the chain cage;
a second pulley rotatably mounted to the chain cage to rotate about a second rotational axis that moves relative to the main derailleur body, the first and second axes of the first and second pulleys being spaced apart by a first distance; and
a third pulley rotatably mounted to the main derailleur body to rotate about a third rotational axis that is fixed in position relative to the second end of the main derailleur body and that is spaced a second distance from the first rotational axis of the first pulley with the first distance being greater than the second distance, the third rotational axis being positioned such that the third pulley is disposed between the pair of plate members of the chain cage with the chain cage in the second orientation and the third pulley being spaced apart from the chain cage with the chain cage in the second orientation.

14. The bicycle rear derailleur as set forth in claim 13, wherein
the third pulley is rotatably supported to the second end of the main derailleur body by a support member that is separate from the chain cage.

15. The bicycle rear derailleur as set forth in claim 13, wherein
the first end of the main derailleur body includes a base member, the second end of the main derailleur body includes a movable member, and the main derailleur body further includes a moving mechanism operatively coupled between the base member and the movable member to move the movable member and the chain cage relative to the base member.

* * * * *